3,535,421
ORAL COMPOSITIONS FOR CALCULUS
RETARDATION
William W. Briner and James S. Widder, Springfield Township, Hamilton County, Ohio, assignors to The Procter & Gamble Company, Cincinnati, Ohio, a corporation of Ohio
No Drawing. Filed July 11, 1968, Ser. No. 743,978
Int. Cl. A61k 7/16
U.S. Cl. 424—52                    10 Claims

ABSTRACT OF THE DISCLOSURE

Oral compositions, such as toothpaste, mouthwash, and the like, containing certain perfluoro-1,2-diphosphonocycloalk-1,2-enes and salts thereof as anticalculus agents, and a water-soluble source of fluoride ions to counteract the adverse effects of such perfluoro-1,2-diphosphonocycloalk - 1,2 - enes on posteruptive maturation of dental enamel.

BACKGROUND OF THE INVENTION

The field of this invention is "oral compositions" which term is used herein to designate products which are not intentionally ingested in the ordinary course of usage but are retained in the oral cavity for a time and in a manner sufficient to contact substantially all of the dental surfaces. Such products include for example dentifrices, mouthwashes, topical solutions, and prophylaxis pastes.

A number of chemical and biological agents have been suggested in the art to retard calculus formation or to remove calculus after it is formed. Mechanical removal of this material periodically by the dentist is, of course, routine dental office procedure. The chemical approach to calculus inhibition generally involves chelation of calcium ion which prevents the calculus from forming and/or breaks down mature calculus by removing calcium. A number of chelating agents have been employed for this purpose. See, for example, British Pat. 490,384, granted Feb. 15, 1937, which discloses oral compositions containing ethylenediaminetetraacetic acid and related polycarboxylic acids as anticalculus agents; German Auslegeschrift 1,149,138 published May 22, 1963, which discloses certain water-soluble diglycolates as anticalculus agents; and U.S. Pat. 1,516,206 which discloses oral compositions containing various sugar lactones for this purpose.

Although certain of the art-disclosed chelators are purportedly safe for use on dental enamel, the chemical similarity of calculus to the tooth structure limits the usefulness of the chelation approach since the more effective chelators can seriously damage the tooth structure by decalcification. Thus, the development of oral compositions which effectively retard calculus formation by calcium chelation has been impeded by safety considerations. Safe and effective anticalculus agents have been developed (see for example U.S. application Ser. No. 689,257, filed Dec. 11, 1967, by Marion D. Francis). While the perfluoro - 1,2 - diphosphonocycloalk-1,2-enes of Francis do not demineralize or substantially alter mature dental enamel, they have been found to impede or prevent post-eruptive maturation of dental enamel.

The maturation of dental enamel is characterized by the gradual influx of those mineral salts which are ultimately present in the mature enamel, followed by crystallization of these salts. Since crystallization is a first step in enamel maturation, the perfluoro-1,2-diphosphonocycloalk-1,2-enes impede or prevent maturation by interfering with calcium hydroxyapatite crystallization in much the same manner that they inhibit calculus formation.

Thus, the compositions of Francis are preferably employed by individuals over about thirteen years of age since dentition and post-eruptive maturation of dental enamel is generally complete at that age.

SUMMARY OF THE INVENTION

It has now been discovered that a water-soluble source of fluoride ions can be used in conjunction with certain perfluoro-1,2-diphosphonocycloalk - 1,2 - enes and salts thereof (sometimes referred to collectively hereinafter as "PFDC") to provide effective anticalculus compositions which neither alter the structure of mature dental enamel nor interfere with post-eruptive maturation thereof.

Suprisingly, it has been found that fluoride ion has no deleterious effect on the anticalculus activity of PFDC, but does permit the post-eruptive maturation of dental enamel to follow its normal course.

It is therefore an object of this invention to provide novel oral compositions which retard the formation of dental calculus without altering mature dental enamel or impeding post-eruptive maturation of the tooth structure.

It is a further object of this invention to provide an improved method for retarding the development of dental calculus.

Other objects will become apparent from the following detailed description.

DETAILED DESCRIPTION OF THE INVENTION

This invention is an oral composition effective in inhibiting the formation of dental calculus without adversely affecting the tooth structure or interfering with post-eruptive maturation of dental enamel comprising (1) from about 0.01% to about 10% by weight of at least one anticalculus agent selected from the group consisting of those of the structural formula:

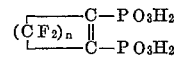

wherein $n$ is an integer from 2 to 4, and the pharmaceutically acceptable salts thereof, such as alkali metal (e.g., sodium and potassium), alkaline earth metal (e.g., calcium and magnesium), stannous, indium, ammonium, or low molecular weight substituted ammonium (e.g., mono-, di-, and triethanolammonium) salts; and (2) a water-soluble source of fluoride ion in a quantity sufficient to provide a mole ratio of perfluoro - 1,2-diphosphonocycloalk-1,2-ene to fluoride ion within the range from about 0.1 to 5.0, the pH of the composition being within the range from about 5.0 to about 11.0.

PFDC can be prepared by any suitable method, however, an especially preferred method involves reacting trialkyl phosphites with 1,2-dichloroperfluorocycloalkenes in accordance with the procedure fully described by Frank in J. Org. Chem., 30 3663 (1965), and hydrolyzing the resulting esters.

The concentration of PFDC in the oral compositions of this invention can range from about 0.01% to about 10% by weight. Oral compositions which in the ordinary course of usage are likely to be accidentally ingested in substantial volumes should contain lower concentrations of PFDC. Thus, a mouth wash in accordance with this invention preferably contains less than about 3% by weight of PFDC. Dentifrice compositions and topical solutions, the latter to be administered professionally, can contain up to about 10% by weight, preferably from about 0.1% to about 5.0% by weight of PFDC.

A wide variety of fluoride salts can be used in the compositions of this invention. Specifically, any water-soluble fluoride salt which is capable of providing at least 25 p.p.m. of fluoride ion in aqueous solution can be used to realize the benefits of this invention.

Among the fluoride salts contemplated for use in this invention are the following:

INORGANIC FLUORIDES

Stannous fluoride
Sodium fluoride
Potassium fluoride
Lithium fluoride
Cesium fluoride
Ammonium fluoride
Aluminum fluoride
Cupric fluoride
Indium fluoride Stannous fluorozirconate
Lead fluoride
Ferric fluoride
Nickel fluoride
Palladium fluoride
Silver fluoride
Zinc fluoride
Zirconium fluoride

ORGANIC FLUORIDES (I) Water-soluble amine hydrofluorides of the formula:

(A)           R·(NH$_2$)$_y$·xHF (B) 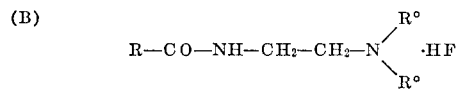

(C) 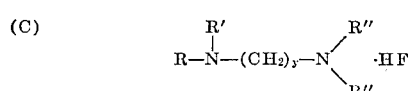

(D) 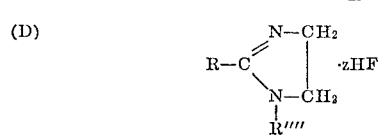

(E) 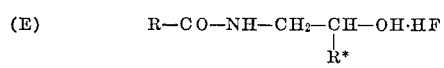

(F) 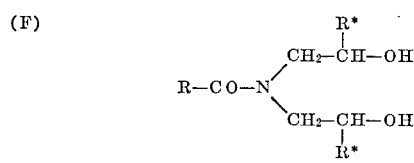

(G)           FH·H$_2$N—R$_1$—NH$_2$·HF and (H) 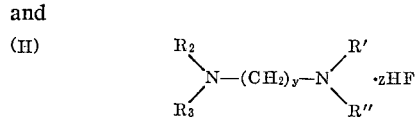

wherein R is a member selected from the group consisting of alkyl, alkoxy, alkenyl, alkylol and aralkyl radicals of not more than 20 carbon atoms; $x$ is a positive integer of at most three; $y$ is a positive integer of at most three; R° is a member selected from the group consisting of hydrogen, alkyl, alkenyl, alkylol, aralkyl and cycloalkyl radicals; each of R', R'', and R''' is a member selected from the group consisting of hydrogen, alkyl, alkoxy, alkylol, alkenyl, acyl, aralkyl, and cycloalkyl radicals; R'''' is a member selected from the group consisting of hydrogen, alkyl, acyl, alkenyl, alkylol, aralkyl and cycloalkyl radicals; R* is a member selected from the group consisting of hydrogen and lower alkyl radicals; R$_1$ is an alkylene radical of not more than 20 carbon atoms; R$_2$ is a member selected from the group consisting of alkyl and alkenyl radicals of not more than 20 atoms; R$_3$ is a member selected from the group consisting of alkyl, alkoxy, acyl, alkenyl, alkylol, aralkyl and cycloalkyl radicals; and $z$ is a positive integer of at most two.

Examples of amine hydrofluorides which are encompassed by the above formulae and are suitable for use in the compositions of this invention are:

Hexylamine hydrofluoride
Laurylamine hydrofluoride
Myristylamine hydrofluoride
Decanolamine hydrofluoride
Octadecenylamine hydrofluoride
Myristoxyamine hydrofluoride
Diethylaminoethyloctoylamide hydrofluoride
Diethanolaminoethyloleylamide hydrofluoride
Diethanolaminopropyl-N'-octadecenylamine dihydrofluoride
1-ethanol-2-hexadecylimidazoline dihydrofluoride
Octoylethanolamine hydrofluoride Those compounds of this class which contain at least one hydrocarbon radical such as an alkyl, alkylol, alkenyl or alkylene radical having from 8 to 20 carbon atoms are especially preferred for use in the compositions of this invention because of their surface active properties. These and other operable amine hydrofluorides as well as a method for their preparation are disclosed by Schmid et al. in U.S. Pat. 3,083,143, granted Mar. 26, 1963.

(II) Water-soluble quaternary ammonium fluorides having an atomic grouping of the formula:

where R represents an alkyl, alkenyl, alkylol, alkoxyalkyl, aryl, aryloxyalkyl, aralkyl, cycloalkyl, cycloalkenyl or heterocyclic radical, or an additional quaternary ammonium radical which may be attached to the nitrogen atom by a bridging group, or a radical of the formula —R$_4$CO·Y where Y represents OH, alkoxy, cycloalkoxy, aralkoxy or

where R$_4$ stands for an alykylene or arylenealkylene radical and each of the symbols R$_5$ and R$_6$ represents hydrogen, or an alkyl, alkenyl, alkylol, aryl, aralkyl, cycloalkyl or heterocyclic radical, or R$_5$ and R$_6$ form together with the nitrogen atom a heterocyclic nucleus, each one of the three free valences being satisfied by an alkyl, alkenyl, alkylol, alkoxyalkyl, aryl, aryloxyalkyl, aralkyl, cycloalkyl, or heterocyclic radical, or two of the free valences being satisfied by a group forming, together with the nitrogen atom, a saturated or unsaturated, unsubstituted or substituted heterocyclic nucleus. The following are specific examples of operable fluorides of this class: Octyltrimethylammonium fluoride, dodecylethyldimethylammonium fluoride, tetraethylammonium fluoride, dilauryldimethylammonium fluoride, Δ$^{8,9}$-octadecenylbenzyldimethylammonium fluoride, dioctyldiethylammonium fluoride, cyclohexylcetyldimethylammonium fluoride, furfuryllauryldimethylammonium fluoride, phenoxyethylcetyldimethylammonium fluoride, N:N'-tetramethyl-N:N'-dilaurylethylene-diammonium difluoride, N-cetylpyridinium fluoride, N:N-dilauryl-morpholinium fluoride, N-myristyl-N-ethylmorpholinium fluoride, N-(octylaminocarbonylethyl)-N-benzyl-dimethylammonium fluoride, N-(β-hydroxydodecyl)trimethylammonium fluoride, N-phenyl-N-hexadecyldiethyl-ammonium fluoride, N-cyclohexyl-N-octadecyldimethyl-ammonium fluoride, N-(2-carbomethoxyethyl)-N-benzyl-ammonium fluoride, N-(2-carbocyclohexoxyethyl)-N-myristyldimethylammonium fluoride, N-(2-carbobenzyloxyethyl) - N - dodecyldimethylammonium fluoride, N-[2-(N:N'-dimethylaminocarbonyl)-ethyl]-N-dodecyldiethylammonium fluoride, N-carboxymethyl-N-eikosyldimethylammonium fluoride, etc. This class of compounds and methods for their preparation are disclosed in U.S. Pat. 3,124,512, granted Mar. 10, 1964.

Compounds of the formula (HOC$_x$H$_{2x}$)$_n$N+(C$_y$H$_{2y+1}$)$_{4-n}$F— wherein $x$ and $y$ are each integers from 1 to 4, and $n$ is an integer from 1 to 3, are also encompassed by the above described class but have a greatly reduced tendency to cause sub-surface demineralization of dental enamel. Dimethyldiethanolammonium fluoride, trimethylethanolammonium fluoride, and methyltriethanolammonium fluoride, can be used to special advantage in conjunction with the polyphosphonates in the compositions of this invention. These compounds and a method for their preparation are fully disclosed in U.S. Pat. 3,235,459, granted Feb. 15, 1966.

(III) Water-soluble addition compounds of amino acids and hydrofluoric acid or fluorides.

Examples of this class of fluorides include:

Betaine hydrofluoride
Sarcosine stannous fluoride
Alanine stannous fluoride
Glycine potassium fluoride
Sarcosine potassium fluoride
Glycine hydrofluoride
Lysine hydrofluoride
Alanine hydrofluoride
Betaine zirconium fluoride Additional operable examples of this class of compounds as well as a method for their preparation are disclosed by Schmid in Canadian Pat. 594,553, granted Mar. 15, 1960.

The concentration of fluoride salt employed in the compositions of this invention will vary with the amount of fluoride ion provided by the particular salt and the concentration of polyphosphonate employed therein. It is essential that an amount of fluoride salt be employed which is sufficient to yield a mole ratio of polpphosphonate to fluoride ion within the range from about 0.1 to 5.0. If this ratio is greater than about 5.0, post-eruptive maturation of dental enamel will be impeded. Toxicity considerations dictate the lower ratio limit inasmuch as the amount of polyphosphonate which can be employed to maintain a ratio below this limit while maintaining a safe level of fluorine in the composition is insufficient to provide the desired anticalculus effects.

The pH of the compositions of this invention is preferably maintained within the range from about 5 to 11. Below about pH 5.0 certain of the fluoride salts and/or polyphosphonates of this invention can damage dental enamel. Above about pH 11.0 the fluoride salts become less effective in promoting post eruptive maturation of dental enamel. A most preferred pH range is from about 6.0 to 7.5.

In addition to the essential components of the oral compositions of this invention as described in the foregoing, such compositions can also contain carriers suitable for use in the oral cavity. Such carriers include the usual components of toothpaste, toothpowder, mouthwash, prophylaxis pastes and the like as more fully described hereinafter.

A dentifrice, especially toothpaste, containing PFDC and a fluoride source is a preferred embodiment of this invention. Toothpaste compositions conventionally contain abrasive materials, sudsing agents, binders, humectants, flavoring and sweening agents.

The abrasive materials and other adjuncts used in the practice of this invention are preferably not sources of much soluble calcium so that the crystal growth inhibiting capactiy of PFDC is not depleted to an extent that its anticalculus activity is impaired. Thus, conventional abrasives such as dicalcium orthophosphate and calcium carbonate are preferably not used. However, predominantly β-phase calcium pyrophosphate prepared for example in accordance with the teachings of Schweizer, U.S. Pat. 3,112,247, granted Nov. 26, 1963, which contains relatively little soluble calcium can be used. An especially preferred class of abrasives for use herein are the particulate thermosetting polymerized resins as described by Cooley et al. in U.S. Pat. 3,070,510, granted Dec. 25, 1962. Suitable resins include, for example, melamines, phenolics, ureas, melamine-ureas, melamine-formaldehydes, urea-formaldehydes, melamine-urea-formaldehydes, cross-linked epoxides, and cross-linked polyesters.

Other suitable abrasives include alumina and the insoluble non-calcium metaphosphates such as sodium metaphosphate. Mixtures of abrasives can also be used. In any case, the total amount of abrasive in the dentifrice embodiments of this invention can range from 0.5% to 95% by weight of the dentifrice. Preferably, toothpastes contain from 20% to 60% by weight of abrasive. Abrasive particle size preferably ranges from $2\mu$ to $20\mu$.

Suitable sudsing agents are those which are reasonably stable and form suds throughout a wide pH range, preferably nonsoap anionic organic synthetic detergents. Examples of such agents are water-soluble salts of alkyl sulfate having from 10 to 18 carbon atoms in the alkyl radical, such as sodium lauryl sulfate; water-soluble salts of sulfonated monoglycerides of fatty acids having from 10 to 18 carbon atoms, such as sodium monoglyceride sulfonates; salts of $C_{10}$–$C_{18}$ fatty acid amides of taurine, such as sodium N-methyl-N-palmitoyl tauride; salts of $C_{10}$–$C_{18}$ fatty acid esters of isethionic acid; and substantially saturated aliphatic acyl amides of saturated monoaminocarboxylic acids having 2 to 6 carbon atoms and in which the acyl radical contains 12 to 16 carbon atoms, such as sodium N-lauroyl sarcoside. Mixtures of two or more sudsing agents can be used.

The sudsing agent can be present in the dentifrice compositions of this invention in an amount from 0.5% to 5% by weight of the total compositions.

In preparing toothpastes, it is necessary to add some thickening material to provide a desirable consistency. Preferred thickening agents are hydroxyethylcellulose and water-soluble salts of cellulose ethers such as sodium carboxymethylcellulose and sodium carboxymethylhydroxyethylcellulose. Natural gums such as gum karaya, gum arabic, and gum tragacanth can also be used. Colloidal magnesium aluminum silicate or finely divided silica can be used as part of the thickening agent to further improve texture. Thickening agents in an amount from 0.5% to 5.0% by weight of the total composition can be used.

It is also desirable to include some humectant material in a toothpaste to keep it from hardening. Suitable humectants include glycerine, sorbitol, and other edible polyhydric alcohols. The humectant can comprise up to about 36% by weight of the toothpaste composition.

Suitable flavoring agents include oil of wintergreen, oil of peppermint, oil of spearmint, oil of sassafras, and oil of clove. Sweetening agents which can be used include saccharin, dextrose, levulose and sodium cyclamate.

Several representative oral compositions illustrating this invention are set forth in the following examples.

EXAMPLE I

A toothpaste of the following composition is prepared by conventional methods:

| | Parts by weight |
|---|---|
| Water | 31.36 |
| Sorbitol | 6.25 |
| Saccharin | 0.12 |
| Calcium pyrophosphate [1] | 39.00 |
| Glycerine | 18.00 |
| Sodium alkyl (coconut) sulfate | 0.40 |
| Sodium coconut monoglyceride sulfonate | 0.75 |
| Sodium carboxymethyl cellulose | 1.15 |
| Magnesium aluminum silicates | 0.40 |
| Flavoring | 0.85 |
| Sodium fluoride | .22 |
| Disodium salt of 3,4,5-hexafluoro-1,2-diphosphonocyclopent-1,2-ene | 1.50 |

Mole ratio PFDC/fluoride ion, 0.76
pH, 5.90

[1] Prepared in accordance with U.S. Pat. 3,112,247 granted Nov. 26, 1963.

This composition effectively retards calculus formation on dental enamel without damaging mature teeth or interfering with the maturation of dental enamel.

Toothpaste compositions substantially identical to the composition of Example I are prepared with the dipotassium salt of 3,4-tetrafluoro-1,2-diphosphonocyclobut-1,2-ene; the mono-calcium salt of 3,4,5,6-octafluoro-1,2-diphosphonocyclohex-1,2-ene; 3,4-tetrafluoro-1,2-diphosphonocyclobut - 1,2 - ene; 3,4,5,6 - octafluoro - 1,2 - diphosphonocyclohex-1,2-ene; and the di(triethanolammonium) salt of 3,4,5-hexafluoro-1,2-diphosphonocyclopent-1,2-ene rather than the disodium salt of 3,4,5-hexafluoro-1,2-diphosphonocyclopent-1,2-ene, adjusting the pH to 5.9. These compositions substantially retard calculus formation and without decalcifying dental enamel or interfering with its maturation.

The sodium fluoride employed in the foregoing examples can be replaced by stannous fluoride, indium fluoride, stannous fluorozirconate, ammonium fluoride, titanium fluoride, strontium fluoride, zinc fluoride or palladium fluoride, in a quantity sufficient to provide an equivalent concentration of fluoride ion, with comparable results.

Further examples of toothpaste compositions in accordance with the invention are set forth in Table 1 below.

When used in the same manner as conventional mouthwash, at least once daily, each of the above compositions materially reduces accumulation of calculus on the surfaces of teeth. No decalcification of dental enamel is observed, nor is post-eruptive maturation of dental enamel impeded.

EXAMPLE XIV

A prophylaxis paste for use by the dentist for removal of stains and polishing the teeth after mechanical removal of calculus deposits is formulated as follows:

| | Parts by weight |
|---|---|
| Navajo pumice | 66.86 |
| $TiO_2$ | 4.00 |
| Glycerine | 17.75 |
| Hydroxyethylcellulose | .22 |
| Saccharin | .33 |
| Stannous fluorozirconate | 2.84 |
| Disodium salt of 3,4,5-hexafluoro-1,2-diphosphonocyclopent-1,2-ene | 4.0 |
| Trisodium salt of 3,4,5-hexafluoro-1,2-diphosphonocylopent-1,2-ene | 4.0 |

Mole ratio PFDC/fluoride ion, 0.36 pH, 7.5

TABLE 1

| Component | II | III | IV | V | VI | VII | VIII | IX |
|---|---|---|---|---|---|---|---|---|
| Melamine/urea/formaldehyde resin [1] | 35.0 | | | | | | | 34.5 |
| Urea/formaldehyde resin [1] | | 31.0 | | 35.0 | | 32.0 | | |
| Sodium metaphosphate | | | 35.5 | | 38.0 | | | |
| Alumina [2] | | | | | | 40.0 | | |
| Glycerine | 18.0 | 18.0 | 18.0 | 18.0 | 18.0 | 18.0 | 18.0 | 18.0 |
| Sorbitol | 6.25 | 6.25 | 6.25 | 6.25 | 6.25 | 6.25 | 6.25 | 6.25 |
| Sodium carboxymethyl cellulose | 1.1 | 1.1 | 1.1 | | 1.1 | | 1.1 | 1.1 |
| Hydroxyethylcellulose | | | | 2.0 | 1.5 | | | |
| Magnesium aluminum silicate | 0.4 | 0.4 | 0.4 | 0.4 | 0.4 | 0.4 | 0.4 | 0.4 |
| Sodium lauryl sulfate | 0.7 | 0.7 | 0.7 | 0.7 | 0.7 | 0.7 | 0.7 | 0.7 |
| Sodium coconut monoglyceride sulfonate | 0.8 | 0.8 | 0.8 | 0.8 | 0.8 | 0.8 | 0.8 | 0.8 |
| Saccharin | 0.12 | 0.12 | 0.12 | 0.12 | 0.12 | 0.12 | 0.12 | 0.12 |
| Flavoring | 0.10 | 0.10 | 0.10 | 0.10 | 0.10 | 0.10 | 0.10 | .10 |
| Sodium fluoride | 0.21 | 0.10 | 0.42 | 0.10 | 0.10 | 0.21 | 0.21 | 0.21 |
| Diammonium salt of 3,4,5-hexafluoro-1,2-diphosphonocyclopent-1,2-ene | 0.5 | | | | | | | 2.5 |
| Monocalcium salt of 3,4-tetrafluoro-1,2-diphosphonocyclobut-1,2-ene | | 1.0 | | | | | | |
| Distannous salt of 3,4-tetrafluoro-1,2-diphosphonocyclobut-1,2-ene | | | 2.5 | | | | | |
| Indium salt of 3,4-tetrafluoro-1,2-diphosphonocyclobut-1,2-ene | | | | 3.0 | | | | |
| Triammonium salt of 3,4-tetrafluoro-1,2-diphosphonocyclobut-1,2-ene | | | | | 4.0 | | | |
| Trisodium salt of 3,4,5,6-octafluoro-1,2-diphosphonocyclohex-1,2-ene | | | | | | 2.5 | | |
| Distannous salt of 3,4,5,6-octafluoro-1,2-diphosphonocyclohex-1,2-ene | | | | | | | 0.5 | 2.5 |
| Water | | | | Balance | | | | |
| Mole ratio PFDC/fluoride ion | 0.25 | 1.2 | 0.91 | 2.8 | 4.5 | 2.4 | 0.77 | 1.3 |
| Adjust pH to | 5.5 | 6.0 | 10.0 | 6.4 | 7.0 | 8.0 | 8.4 | 7.0 |

[1] As described in U.S. Pat. 3,070,510.
[2] Prepared in accordance with U.S. Pat. 3,003,919.

Several mouthwash compositions are prepared in accordance with this invention as follows:

| | Example | | | |
|---|---|---|---|---|
| | X | XI | XII | XIII |
| | Percent by weight | | | |
| Component: | | | | |
| Glycerine | 10.0 | 10.0 | 10.0 | 10.0 |
| Ethyl alcohol | 16.5 | 16.5 | 16.5 | 16.5 |
| Tween 80 [1] | .12 | .12 | .12 | .12 |
| Saccharin | .045 | .045 | .045 | .045 |
| Sodium cyclamate | .075 | .075 | .075 | .075 |
| Flavor | .088 | .088 | .088 | .088 |
| Stannous fluoride | .205 | .82 | .205 | .41 |
| PFDC | [2] 1.0 | [3] 3.0 | [4] 5.0 | [5] 7.0 |
| Water | | Balance | | |
| Mole ratio PFDC/fluoride ion | 1.1 | .76 | 4.2 | 3.3 |
| pH [6] | 6.0 | 8.5 | 10.0 | 10.0 |

[1] Polyoxyethylene (20 moles of ethylene oxide) sorbitan monooleate—a nonionic emulsifier supplied by Atlas Powder Company.
[2] 3,4,5-hexafluoro-1,2-diphosphonocyclopent-1,2-ene.
[3] Triammonium salt of 3,4,5-hexfluoro-1,2-diphosphonocyclopent-1,2-ene.
[4] Tripotassium salt of 3,4,5-hexafluoro-1,2-diphosphonocyclopent-1,2-ene.
[5] Trisodium salt of 3,4,5-hexafluoro-1,2-diphosphonocyclopent-1,2-ene.
[6] Adjusted to value indicated with the base solution corresponding to the salt used.

When applied to the teeth with a prophylactic rubber cup in the conventional manner, this composition helps retard the development of new calculus deposits without damaging dental enamel or interfering with its maturation.

The stannous fluorozirconate employed in this example can be replaced with laurylaminehydrofluoride, methyltriethanolammonium fluoride, lysine hydrofluoride, cetyl pyridinium fluoride, or laurylbenzyldimethylammonium fluoride with substantially equivalent results.

Toothpowders and the like can be prepared by conventional methods and containing, in addition to the usual ingredients, an amount of PFDC within the ranges specified herein, to provide an effective means of retarding calculus formation without damaging the tooth structure.

Those components other than PFDC and fluoride salts which were included in the foregoing examples and various mixtures of those components are illustrative of carriers suitable for use in the oral cavity.

In reference to pH adjustments in the foregoing examples, it is to be understood that a base of a cation corresponding to the salt form of the PFDC employed is used. In each case in which the PFDC was added in its acid form to the example compositions, the pH was adjusted to the specified value with NaOH. Adjustments in pH to more acid levels when adding the PFDC in the salt forms is accomplished with HCl. It will be obvious to those skilled in the art that pH adjustments can be made with any acid or base suitable for use in the oral cavity.

What is claimed is:

1. An oral composition for retarding the formation of dental calculus comprising (1) from about .01% to about 10% by weight of at least one anticalculus agent selected from the group consisting of those of the formula:

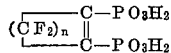

wherein $n$ is an integer from 2 to 4, and the pharmaceutically aceptble salts thereof; and (2) a water-soluble source of a non-toxic fluoride ion in a quantity sufficient to provide a mole ratio of said anticalculus agent to fluoride ion within the range from about 0.1 to 5.0, the pH of the composition being within the range from about 5.0 to about 11.0.

2. The composition of claim 1 wherein the anticalculus agent is 3,4,5-hexafluoro - 1,2 - diphosphonocyclopent-1,2-ene or a pharmaceutically acceptable salt thereof.

3. The composition of claim 1 wherein the anticalculus agent is 3,4-tetrafluoro - 1,2 - diphosphonocyclobut-1,2-ene or a pharmaceutically acceptable salt thereof.

4. The composition of claim 1 wherein the anticalculus agent is 3,4,5,6-octafluoro - 1,2 - diphosphonocyclohex-1,2-ene or a pharmaceutically acceptable salt thereof.

5. The composition of claim 1 wherein the water-soluble source of fluoride ion is sodium fluoride.

6. The composition of claim 1 wherein the water-soluble source of fluoride ion is stannous fluoride.

7. A toothpaste composition comprising from about 0.1% to about 5.0% by weight of at least one anticalculus agent selected from the group consisting of those of the formula:

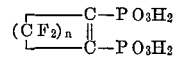

wherein $n$ is an integer from 2 to 4 and the pharmaceutically acceptable salts thereof; (2) a water-soluble source of a non-toxic fluoride ion in a quantity sufficient to provide a mole ratio of said anticalculus agent to fluoride ion of from about 0.1 to 5.0; and (3) from about 20% to about 60% by weight of dentifrice abrasive, the pH of said composition being in the range from about 5.0 to about 11.0.

8. The composition of claim 7 wherein the anticalculus agent is 3,4,5 - hexafluoro-1,2-diphosphonocyclopent-1,2-ene or an alkali metal, alkaline earth metal, stannous, indium, ammonium, or low molecular weight substituted ammonium salt thereof.

9. The composition of claim 7 wherein the anticalculus agent is 3,4-tetrafluoro - 1,2 - diphosphonocyclobut-1,2-ene or an alkali metal, alkaline earth metal, stannous, indium, ammonium, or low molecular weight substituted ammonium salt thereof.

10. The composition of claim 7 wherein the anticalculus agent is 3,4,5,6-octafluoro - 1,2 - diphosphonocyclohex-1,2-ene or an alkali metal, alkaline earth metal, stannous, indium, ammonium, or low molecular weight substituted ammonium salt thereof.

References Cited

Hoffman et al., Journal of Periodontology, vol. 34, p. 44, July 1963.

RICHARD L. HUFF, Primary Examiner